United States Patent [19]

Kermer et al.

[11] Patent Number: 5,202,028
[45] Date of Patent: Apr. 13, 1993

[54] REMOVAL OF METAL COMPLEX DYES FROM WASTEWATERS

[75] Inventors: Wolf-Dieter Kermer, Fussgoenheim; Ingrid Steenken-Richter, Ludwigshafen; Juergen Paulig, Limburgerhof, all of Fed. Rep. of Germany

[73] Assignee: BASF Aktiengesellschaft, Ludwigshaften, Fed. Rep. of Germany

[21] Appl. No.: 940,333

[22] Filed: Sep. 3, 1992

[30] Foreign Application Priority Data

Sep. 7, 1991 [JP] Japan .................. 3-4129802

[51] Int. Cl.$^5$ ............................. C02F 1/26
[52] U.S. Cl. .................. 210/634; 210/917; 8/440
[58] Field of Search ............ 8/440; 210/634, 917

[56] References Cited

U.S. PATENT DOCUMENTS

| | | | |
|---|---|---|---|
| 1,297,046 | 3/1919 | Wall | 8/440 |
| 3,502,577 | 3/1970 | Hutchins et al. | 8/440 |
| 3,829,380 | 8/1974 | Oohara | 8/440 |
| 3,947,248 | 3/1976 | Powers | 8/440 |
| 4,000,069 | 12/1976 | Fusco | 8/440 |
| 4,165,288 | 8/1979 | Teed et al. | 8/440 |
| 4,753,732 | 6/1988 | Davis et al. | 210/634 |

Primary Examiner—Stanley S. Silverman
Assistant Examiner—Neil M. McCarthy
Attorney, Agent, or Firm—Oblon, Spivak, McClelland, Maier & Neustadt

[57] ABSTRACT

Metal complex dyes which are free of reactive groups and have at least one hydroxysulfonyl group are removed from wastewaters by means of amines of at least 6 carbon atoms in the presence or absence of water-immiscible inert organic solvents.

2 Claims, No Drawings

REMOVAL OF METAL COMPLEX DYES FROM WASTEWATERS

The present invention relates to a novel process for removing metal complex dyes from wastewaters by means of amines.

In the dyeing or printing of textile fibers or fabrics it is usually the case that not all the dye used will go onto the textile material, so that in general the resulting wastewaters will still contain dye.

This is particularly undesirable in the dyeing of fibers or fabrics made of wool or other natural or synthetic polyamides, blends thereof or for example with cellulose, polyesters, polyacrylonitrile or polyurethanes, since the dyes used are frequently heavy metal complexes of, for example, azo or azomethine dyes.

It is an object of the present invention to provide a novel process for removing metal complex dyes from dyehouse wastewaters which is simple to carry out and by means of which the dyes still present in the wastewater can be removed virtually quantitatively. It is another object of the present invention to carry out the process in such a way that the metal complex dyes removed from the wastewater can be recycled into the dyeing process.

We have found that these objects are achieved by a process for removing from wastewaters metal complex dyes which are free of reactive groups and have at least one hydroxysulfonyl group, comprising treating the wastewater with one or more primary, secondary or tertiary amines of at least 6 carbon atoms and optionally with a water-immiscible inert organic solvent, then separating the phases, treating the organic phase with aqueous alkali, and finally separating off the metal complex dye, which is present in the resulting aqueous phase, and the amine, which may be present mixed with the organic solvent.

We have also found that the process of the invention will also remove from the wastewater some lipophilic, optionally halogen-containing substances, e.g. yolk, lipophilic auxiliaries or concomitants of chlorinated wool.

The metal complex dyes to be removed in the process of the invention are in general chromium, cobalt, copper, nickel or iron complexes of monoazo or disazo dyes. In general they take the form of 1:1 or 1:2 metal complexes.

The azo dyes are free of reactive groups and customarily contain one or more hydroxysulfonyl groups. They may additionally contain carboxyl groups. In general they are in the form of salts, for example in the form of alkali metal salts, such as potassium or in particular sodium salts, or in the form of ammonium salts.

The metallized groups are each preferably disposed ortho to the azo group, for example in the form of o,o'-dihydroxy-, o-hydroxy-o'-carboxy-, o-carboxy-o'-amino- or o-hydroxy-o'-amino-azo groups.

In the Colour Index these dyes are classified as acid dyes. Examples are C.I. Acid Yellow 99 (13900), C.I. Yellow 104, C.I. Acid Yellow 176, C.I. Acid Yellow 194, C.I. Acid Yellow 204, C.I. Acid Yellow 241, C.I. Acid Orange 74 (18745), C.I. Orange 142, C.I. Acid Red 186 (18810), C.I. Acid Red 214 (19355), C.I. Acid Red 315, C.I. Acid Red 357, C.I. Acid Red 359, C.I. Acid Red 362, C.I. Acid Violet 58 (16260), C.I. Acid Violet 90 (18762), C.I. Acid Blue 158 (14880), C.I. Acid Blue 185, C.I. Acid Blue 193 (15707), C.I. Acid Blue 284, C.I. Acid Blue 296, C.I. Acid Blue 317, C.I. Acid Blue 342, C.I. Acid Brown 282, C.I. Acid Brown 289, C.I. Acid Brown 355, C.I. Acid Brown 365, C.I. Acid Green 12 (13425), C.I. Acid Green 104, C.I. Acid Green 108, C.I. Acid Black 52 (15711), C.I. Acid Black 187 and C.I. Acid Black 194.

Other possible dyes include C.I. Solvent Yellow 19 (13900:1), C.I. Solvent Yellow 21 (18690), C.I. Solvent Yellow 32 (48045), C.I. Solvent Orange 5 (18745:1), C.I. Solvent Orange 6 (18736:1), C.I. Direct Blue 86 and C.I. Direct Blue 199.

The amines employed in the process of the invention are primary, secondary or tertiary amines. They are alkylamines and have at least 6 carbon atoms. The alkyl moieties may interrupted by 1 or 2 oxygen atoms in ether function and may be substituted by phenyl.

Examples of suitable primary amines are hexylamine, 2-methylpentylamine, heptylamine, 1-ethylpentylamine, octylamine, 2-ethylhexylamine, isooctylamine, nonylamine, isononylamine, decylamine, isodecylamine, undecylamine, dodecylamine, tridecylamine, isotridecylamine, (the above designations isooctyl, isononyl, isodecyl and isotridecyl are trivial names derived from the oxo process alcohols - cf. Ullmanns Encyklopädie der technischen Chemie, 4th Edition, Volume 7, pages 215 to 217, and Volume 11, pages 435 and 436), tetradecylamine, pentadecylamine, hexadecylamine, heptadecylamine, octadecylamine, 3-(2-ethylhexyloxy)-propylamine and 2-phenylethylamine.

Examples of suitable secondary amines are N-ethyl-N-butylamine, dibutylamine, diisobutylamine, N-methyl-N-(2-ethylhexyl)amine, N-ethyl-N-(2-ethylhexylamine), bis(2-ethylhexyl)amine and diisotridecylamine.

Examples of suitable tertiary amines are tributylamine, N,N-dimethyl-N-(2-ethylhexyl)amine and N,N-dimethyl-N-$C_{10}$/$C_{18}$-alkylamine (mixture).

Examples of water-immiscible inert organic solvents are aliphatic hydrocarbons, such as pentane, hexane, heptane, octane, 2-ethylhexane, isooctane, nonane, isononane, decane, isodecane, undecane, dodecane, tridecane, isotridecane, cyclohexane, petroleum ether, light naphtha, mineral spirit, petroleum, kerosene or mixtures thereof, and aromatic hydrocarbons, such as benzene, toluene, o-, m- or p-xylene, dimethylnaphthalene or mixtures thereof.

Preference is given to a procedure whereby the wastewater is treated with amine and with a water-immiscible inert organic solvent. Here the use of aliphatic hydrocarbons is preferred.

Preference is further given to a procedure whereby the wastewater is treated with a primary, secondary or tertiary amine of from 6 to 30, preferably from 8 to 26, carbon atoms.

Aqueous alkali for the purposes of the present invention is sodium or potassium hydroxide solution, generally from 5 to 50% strength by weight, preferably from 5 to 30% strength by weight. The use of sodium hydroxide solution is preferred.

The wastewater to be treated contains, depending on the strength of the dyeing, up to about 250 mg of metal complex dye (based on the pure form) per liter. There is no lower limit for the dye concentration in the usual sense, since the process of the invention can also be applied to wastewaters containing a very low concentration of metal complex dyes, but for economic reasons the wastewater should contain at least about 5 mg of metal complex dye per liter.

The pH of the wastewater to be treated should normally be within the range from 1.5 to 8.0. If primary or secondary amines are employed, the pH is preferably from 1.5 to 4. If tertiary amines are employed, it is preferably from 3 to 5.5.

The amount of primary, secondary or tertiary amine in the process of the invention is in general from 1 to 10% by weight, preferably from 2 to 5% by weight, each percentage being based on the weight of wastewater to be treated.

The amount of water-immiscible inert organic solvent in the process of the invention is in general from 0 to 20% by weight, preferably from 4 to 10% by weight, each percentage being based on the weight of wastewater to be treated.

Both the amines and the inert organic solvent can be used in larger amounts than those specified above, but this does not result in any advantages.

The amount of aqueous alkali in the process of the invention is in general from 30 to 300% by volume, preferably from 40 to 150% by volume, each percentage being based on the volume of the organic phase.

The process of the invention is customarily carried out at from 5° to 80° C., preferably at from 15° to 40° C.

The novel process is conveniently carried out by first mixing the wastewater in a suitable apparatus, for example in a stirred kettle, with one or more amines and, if used, the organic solvent at the abovementioned temperature and the abovementioned pH and stirring for 2-45 minutes. Then the organic phase is separated from the wastewater, which can be discharged for further treatment.

The organic phase may be repeatedly reused, since it will be frequently only completely saturated with dye after it has been used from five to twenty times.

The organic phase is then treated with aqueous alkali at the abovementioned temperature by stirring. Following a stirring phase of from 2 to 45 minutes, the aqueous phase, which contains the metal complex dye, and the amine, which may be present mixed with the organic solvent, can be separated from one another by phase separation.

After acidification the aqueous solution may be used in the dyehouse to make up a fresh dyebath.

The recovered amine may be reused with or without the inert solvent for removing metal complex dye. In general, this can again be done repeatedly, namely until the organic phase has become unusable due to lipophilic contamination. However, it is also possible for the amine to be regenerated, like the inert solvent, for example by distillation.

The process of the invention, which can be carried out continuously as well as batchwise, is simple to carry out and yields a colorless wastewater which is essentially free of metal complex dye. It is also advantageous that the removal of halogen-containing metal complex dyes achieves a reduction in the AOX value (as defined in DIN 38 409-H14) of the wastewater. The removed dye can, as mentioned earlier, be reused in dyeing.

Embodiments of the invention will now be more particularly described by way of example.

General dyeing method

I. 1:1 Metal complex dyes
Material: untreated wool
Recipe:
   5% by weight of dye
   5% by weight of concentrated sulfuric acid
   2% by weight of surfactant based on ethoxylated amine pH about 1.5
Liquor ratio: 20:1
Temperature program: heat to 100° C. over 60 minutes and maintain at 100° C. for 60 minutes.

II. 1:2 Metal complex dyes
Material: chlorinated wool
Recipe:
   5% by weight of dye
   5% by weight of ammonium sulfate
   0.5% by weight of surfactant based on ethoxylated amine
   use acetic acid to set pH 4.5
Liquor ratio: 20:1
Temperature program: heat to 100° C. over 60 minutes and maintain at 100° C. for 75 minutes.

The spent but incompletely exhausted liquors thus obtained were used in some cases without adjustment of the pH (i.e. at pH 2.3-2.5 in the case of the 1:1 metal complex dyes and at pH 5-5.5 in the case of the 1:2 metal complex dyes) for the decolorizing trials more particularly described in the Examples. In other cases the pH was varied.

EXAMPLE 1

100 ml of a spent but colored liquor (dyeing method I) containing 204 mg of the dye C.I. Acid Red 214 (19355)/1 were stirred for 5 minutes with 5 ml of diisotridecylamine and 10 ml of a commercial mixture of aliphatic hydrocarbons (Shellsol ® D70 from Shell) in a beaker at 25° C. and pH 2.5. (It is also possible to carry out this step in a separating funnel by shaking.) Then the stirring was discontinued and the organic phase was separated from the wastewater.

The resulting wastewater still contained 4 mg of dye/l. Its chromium content, which was 5 mg/l prior to the treatment, was now below 0.2 mg/l.

Tables 1 and 2 below show further Examples carried out in the same way, the spent liquors in Table 1 resulting from dyeing method I and those in Table 2 from dyeing method II.

The absorbance was in each case determined in a cuvette having a path length of 1 cm.
  a) Four runs were carried out, each with 500 ml of colored spent liquor, which were treated with 10 ml of amine and 20 ml of solvent.
  b) The solvent used was xylene.
  c) 500 ml of spent liquor were used.
  d) Four runs were carried out each with 100 ml of spent liquor.
  e) Three runs were carried out, each with 500 ml of spent liquor, which were treated with 20 ml of amine and 40 ml of solvent.

TABLE 1

| Ex. No. | Dye | $\lambda_{max}$ [nm] | Dye conc. [mg/l] | Amine | pH of waste-water | Absorbance before | Absorbance after | Chromium content [mg/l] before after | AOX [mg/l] before after |
|---|---|---|---|---|---|---|---|---|---|
| 2 | Mixture | 585 | 120 | Isotridecylamine | 2.3[a] | 0.750 | 0.000 | | |
| 3 | C.I. Acid Blue 158, | 585 | 120 | Isotridecylamine | 4.0 | 0.750 | 0.058 | | |
| 4 | C.I. Acid Red 186 and | 585 | 120 | Diisotridecylamine | 2.3[a] | 0.750 | 0.000 | | |
| 5 | C.I. Acid Violet 58 | 585 | 120 | Diisotridecylamine | 4.0 | 0.750 | 0.000 | | |
| 6 | C.I. Acid Red 214 | 510 | 204 | Hexylamine | 2.3 | 1.628 | 0.200 | | |
| 7 | | 510 | 204 | Octylamine | 2.3 | 1.628 | 0.014 | | |
| 8 | | 510 | 204 | 2-Ethylhexylamine | 2.3 | 1.628 | 0.107 | | |
| 9 | | 510 | 204 | Isotridecylamine | 2.5 | 1.628 | 0.041 | 5 <0.1 | |
| 10 | | 510 | 204 | Diisotridecylamine | 1.5 | 1.628 | 0.125 | | |
| 11 | | 510 | 204 | Diisotridecylamine | 3.5 | 1.628 | 0.154 | | |
| 12 | | 510 | 204 | Diisotridecylamine | 4.5 | 1.628 | 0.304 | | |
| 13[b] | C.I. Acid Yellow 104 | 436 | | Hexadecylamine | 3 | 2.211 | 0.000 | | |
| 14[b] | | 436 | | Hexadecylamine | 5.5 | 2.211 | 0.000 | | |
| 15 | Mixture of C.I. Acid Red 183 and C.I. Acid Red 186 | 510 | 135 | Diisotridecylamine | 2.0[c] | 1.137 | 0.043 | | 2.3 0.5 |
| 16 | | 510 | 135 | 3-(2-Ethylhexyloxy)propylamine | 2.0 | 1.137 | 0.019 | | |
| 17 | | 510 | 135 | 3-(2-Ethylhexyloxy)propylamine | 4.5 | 1.137 | 0.040 | | |
| 18 | Mixture of C.I. Acid Blue 158, | 620 | | Tributylamine | 1.5 | 1.628 | light blue* | | |
| 19 | C.I. Acid Blue 161 and C.I. Acid Red 186 | 620 | | Tributylamine | 2.5 | 1.628 | light blue* | | |

*)The resulting solution was cloudy and was therefore assessed visually.

TABLE 2

| Ex. No. | Dye | $\lambda_{max}$ [nm] | Dye conc. [mg/l] | Amine | pH of waste-water | Absorbance before | Evaluation of color Absorbance after visually*) | Chromium content [mg/l] before after | AOX [mg/l] before after |
|---|---|---|---|---|---|---|---|---|---|
| 20 | | 585 | | Isotridecylamine | 2.5[d] | 1.571 | almost colorless | | |
| 21 | C.I. Acid Black 194 | 585 | | Diisotridecylamine | 5.5[d] | 0.776 | colorless | | |
| 22 | | 585 | | Diisotridecylamine | 5.9[e] | 2.457 | very weak gray | 6 0.2 | |
| 23 | | 510 | 25 | Diisotridecylamine | 5.5 | 0.464 | pink | | |
| 24 | | 510 | 25 | Diisotridecylamine | 2.1 | 0.464 | light pink | | 1.6 <0.5 |
| 25 | C.I. Acid Red 362 | 510 | 25 | Diisotridecylamine | 1.5 | 0.464 | colorless | | |
| 26 | | 510 | 34 | Hexylamine | 5.5 | 0.627 | 0.016 | | |
| 27 | | 510 | 34 | Octylamine | 5.5 | 0.627 | colorless | | |
| 28 | | 510 | 34 | Octylamine | 7.0 | 0.627 | colorless | | |
| 29 | | 510 | 34 | 2-Ethylhexylamine | 5.5 | 0.627 | light pink | | |

*)The resulting solution was cloudy and was therefore assessed visually.

The effect of the solvent on the decolorization achieved is shown below in Tables 3 and 4.

EXAMPLES 30 TO 33

In each case 100 ml of spent dyeing liquors (dyeing method I) were treated with 5 ml of octylamine and optionally 10 ml of a solvent in a separating funnel by shaking for 5 minutes. The aqueous phase was then discharged and its absorbance was determined.

| Ex. No. | Dye | Amine | Solvent | pH of waste-water | Absorbance | $\lambda_{max}$ |
|---|---|---|---|---|---|---|
| 30 | Mixture of C.I. Acid Blue 158, C.I. Acid Violet 58 and C.I. Acid Red 186 | Octylamine | Shell-sol D 70 | 2.3 | 0.000[f] | 585 |
| 31 | | Octylamine | Xylene | 2.3 | 0.015[f] | 585 |
| 32 | C.I. Acid Red 214 | Octylamine | Shell-sol | 2.5 | 0.012[g] | 510 |

| Ex. No. | Dye | Amine | Solvent | pH of waste-water | Absorbance | $\lambda_{max}$ |
|---|---|---|---|---|---|---|
| 33 | | Octyl-amine | D 70 | 2.5 | 0.028[g] | 510 |

[f] Absorbance prior to treatment: 0.750
[g] Absorbance prior to treatment: 1.628

EXAMPLES 34 TO 37

Nonchlorinated wool was dyed with C.I. Acid Red 214. The resulting spent liquor (dyeing method I) had a pH of 2.4 and an absorbance of 1.748 ($\lambda_{max}$:510 nm). In each case 100 ml of the dyeing liquor were stirred in a beaker with 5 ml of isotridecylamine on the one hand or with 5 ml of diisotridecylamine on the other, each dissolved in 10 ml of solvent.

Phase separation occurred after 10 minutes. The aqueous phase was then separated off and its absorbance was determined.

The results are shown in Table 4:

| Ex. No. | Amine | Solvent | Absorbance after treatment | $\lambda_{max}$ |
|---|---|---|---|---|
| 34 | Isotridecylamine | Shellsol D 70 | 0.041 | 510 |
| 35 | Diisotridecylamine | Shellsol D 70 | 0.085 | 510 |
| 36 | Isotridecylamine | Octane | 0.006 | 510 |
| 37 | Diisotridecylamine | Octane | 0.065 | 510 |

EXAMPLE 38 a) Repeated use of amine

A total of 2 l of colored spent liquor (dyeing method I) containing a mixture of C.I. Acid Blue 158, C.I. Acid Blue 161 and C.I. Acid Red 186 was extracted in portions of 500 ml with a mixture of 20 ml of diisotridecylamine and 40 ml of Shellsol D 70 at pH 1.6. The dye-enriched amine phase obtained from the first extraction was used a further three times for decolorizing the remaining wastewater. The resulting wastewater had an absorbance of 0.045 ($\lambda_{max}$:620 nm), while the absorbance of the untreated solution was 1.289.

b) Recovery of organic phase and of dye 60 ml of the amine-solvent mixture which contained the dye and lipophilic substances from the dyebath were extracted for 5 minutes with 60 ml of 25% strength by weight sodium hydroxide solution in a separating funnel. After phase separation 59 ml of a slightly brownish amine phase were recovered. The dye had transferred virtually completely to the aqueous phase.

c) The use of amine and of dye c1) Amine 500 ml of a dyeing liquor (see a)) were extracted for 3 minutes with 59 ml of the recovered amine-solvent mixture at pH 1.6. After the organic phase had been separated off, it was reused a further two times for decolorizing 500 ml of wastewater each time. The decolorized solutions were combined. The absorbance was 0.038.

c2) Dye

The aqueous phase described under b) was carefully adjusted with dilute sulfuric acid to a pH of 1.5 and then used for dyeing wool (see dyeing method I). Exhaustion was quantitative.

d) Second recovery of organic phase 60 ml of the amine-solvent mixture were shaken for 3 minutes with 30 ml of 50% strength by weight sodium hydroxide solution. The result was identical to that described under b).

EXAMPLE 39

A spent but colored liquor dyeing method I), which still contained 120 mg of a mixture of the metal complex dyes C.I. Acid Blue 158, C.I. Acid Violet 58 and C.I. Acid Red 186/1, was stirred 7 times in succession in portions of 100 ml with 5 ml of isotridecylamine and 10 ml of Shellsol D 70 at pH 2.3. The absorbance of the wastewater after treatment was 0.000 in all seven cases, whereas it had previously been 0.750 ($\lambda_{max}$:620 nm).

The organic phase was then recovered with 20 ml of 50% strength by weight sodium hydroxide solution as described in Example 38 and reused for decolorizing 3×100 ml of wastewater.

We claim:

1. A process for removing from wastewaters metal complex dyes which are free of reactive groups and have at least one hydroxysulfonyl group, comprising treating the wastewater with one or more primary, secondary or tertiary amines of at least 6 carbon atoms and optionally with a water-immiscible inert organic solvent, then separating the phases, treating the organic phase with aqueous alkali, and finally separating off the metal complex dye, which is present in the resulting aqueous phase, and the amine, which may be present mixed with the organic solvent.

2. A process as claimed in claim 1, wherein the wastewater is treated with amine and with a water-immiscible inert organic solvent.

* * * * *

UNITED STATES PATENT AND TRADEMARK OFFICE
CERTIFICATE OF CORRECTION

PATENT NO. : 5,202,028
DATED : April 13, 1993
INVENTOR(S) : Wolf-Dieter Kermer et al.

It is certified that error appears in the above-identified patent and that said Letters Patent is hereby corrected as shown below:

On the title page, Item [30],

The Foreign Application Priority Data is incorrect, should read as follows: --Sep. 7, 1991 [DE] Fed. Rep. of Germany.......4129802--

Signed and Sealed this

Thirtieth Day of November, 1993

Attest:

BRUCE LEHMAN

*Attesting Officer*     *Commissioner of Patents and Trademarks*